United States Patent
Franchet et al.

(10) Patent No.: US 7,325,307 B2
(45) Date of Patent: Feb. 5, 2008

(54) INSTALLATION FOR SHAPING A HOLLOW BLADE

(75) Inventors: Jean-Michel Patrick Maurice Franchet, Paris (FR); Patrick Gesmier, Sannois (FR); Benoit Antoine Yves Marty, Voisins le Bretonneux (FR)

(73) Assignee: SNECMA Moteurs, Paris (FR)

( * ) Notice: Subject to any disclaimer, the term of this patent is extended or adjusted under 35 U.S.C. 154(b) by 286 days.

(21) Appl. No.: 11/148,162

(22) Filed: Jun. 9, 2005

(65) Prior Publication Data

US 2006/0005594 A1    Jan. 12, 2006

(30) Foreign Application Priority Data

Jun. 11, 2004   (FR)   .................................. 04 06339

(51) Int. Cl.
*B23P 17/02*   (2006.01)
*B21D 26/02*   (2006.01)

(52) U.S. Cl. ........................ 29/889.72; 29/889.7; 72/58; 72/61; 228/118; 228/212

(58) Field of Classification Search ............. 72/58, 72/61, 60; 29/889.72, 889.7; 228/118, 212, 228/243

See application file for complete search history.

(56) References Cited

U.S. PATENT DOCUMENTS

| | | | | |
|---|---|---|---|---|
| 4,089,456 A | * | 5/1978 | Toppen et al. | 29/889.72 |
| 4,882,823 A | * | 11/1989 | Weisert et al. | 29/421.1 |
| 4,951,491 A | | 8/1990 | Lorenz | |
| 5,072,871 A | * | 12/1991 | Moracz et al. | 228/193 |
| 5,226,578 A | | 7/1993 | Douglas | |
| 5,253,419 A | * | 10/1993 | Collot et al. | 29/889.72 |
| 5,277,045 A | | 1/1994 | Mahoney et al. | |
| 5,469,618 A | * | 11/1995 | LeMonds et al. | 29/889.72 |
| 5,479,705 A | * | 1/1996 | Fowler et al. | 29/889.72 |
| 5,636,440 A | * | 6/1997 | Bichon et al. | 29/889.72 |
| 5,826,332 A | * | 10/1998 | Bichon et al. | 29/889.72 |
| 5,896,658 A | * | 4/1999 | Calle et al. | 29/889.7 |
| 6,210,630 B1 | | 4/2001 | Bergue et al. | |

FOREIGN PATENT DOCUMENTS

FR   2 724 127   3/1996
FR   2 806 339   9/2001

* cited by examiner

*Primary Examiner*—David B Jones
(74) *Attorney, Agent, or Firm*—Oblon, Spivak, McClelland, Maier & Neustadt, P.C.

(57) ABSTRACT

A hollow blade is shaped by superplastic inflation of a blank made up of welded-together sheets. A die comprising two hollow shapes clamping the outline of the blank is placed inside an autoclave-forming enclosure in order to subject the blank to superplastic inflation, and the two hollow shapes are united by U-shaped clamps made of a material having a coefficient of thermal expansion that is smaller than that of the material constituting said shapes.

14 Claims, 3 Drawing Sheets

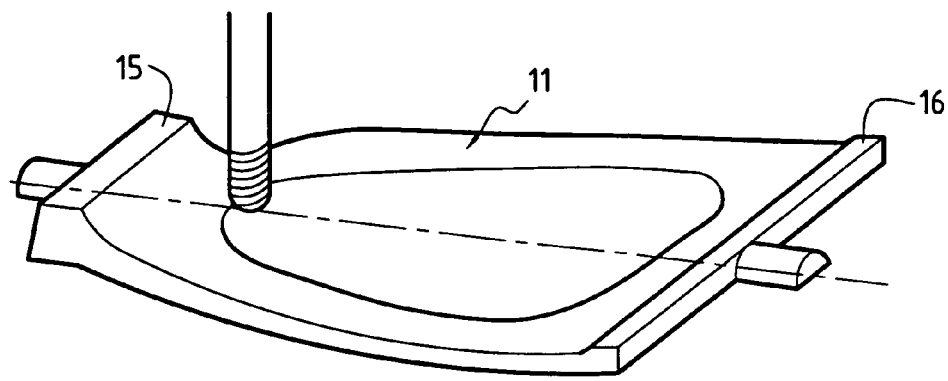
FIG.1
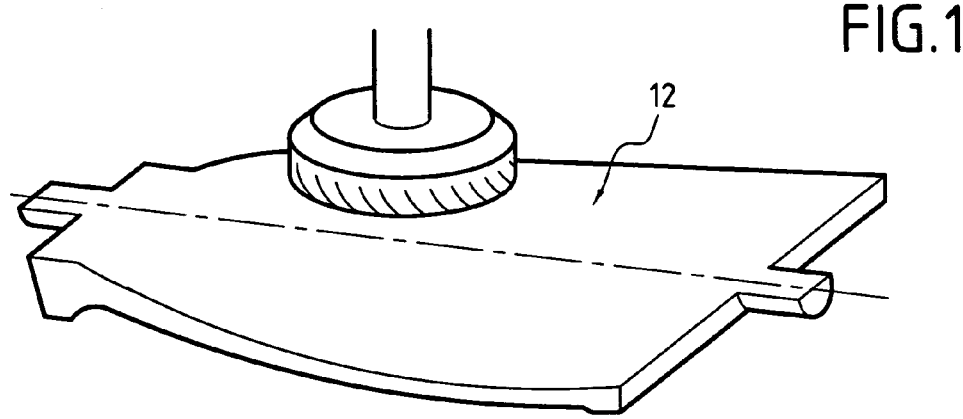
FIG.2
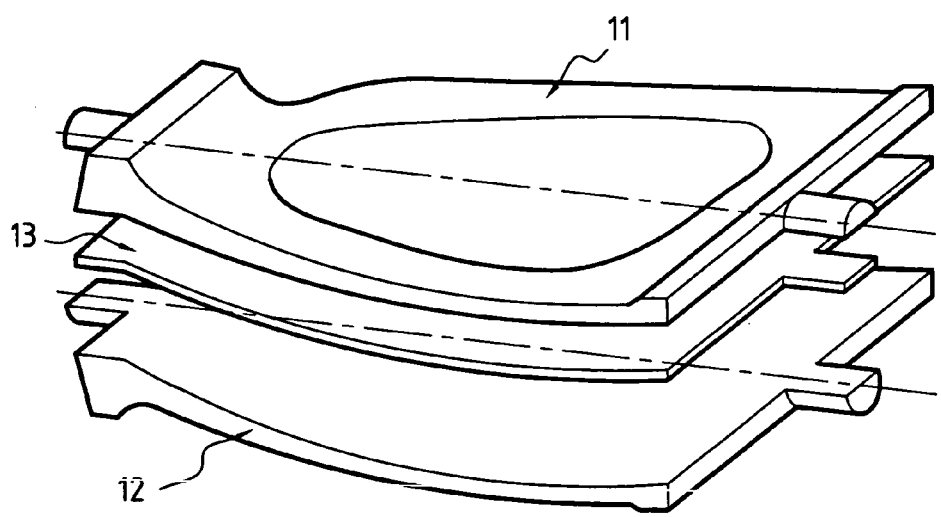

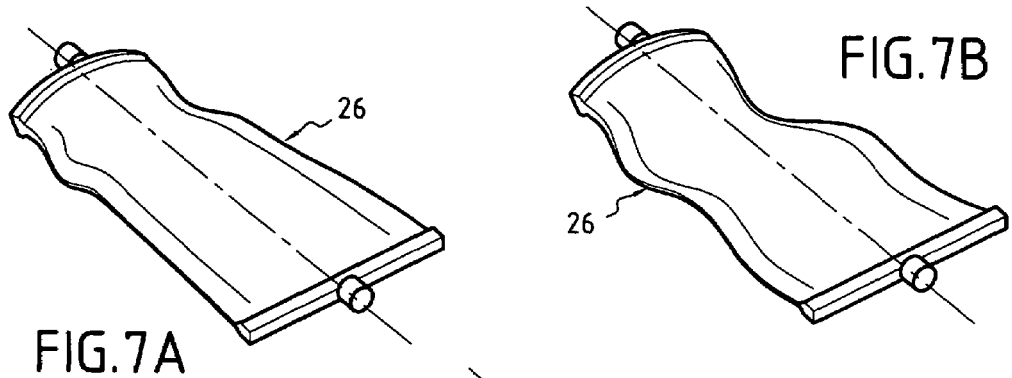
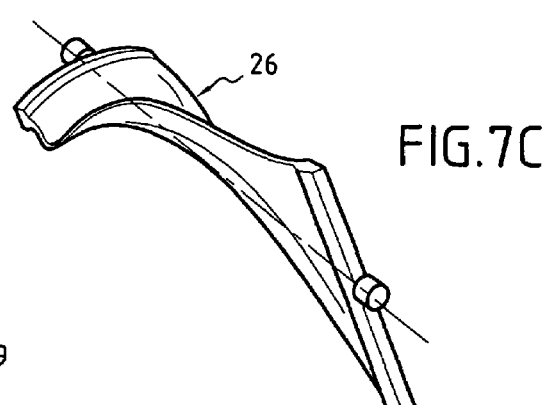
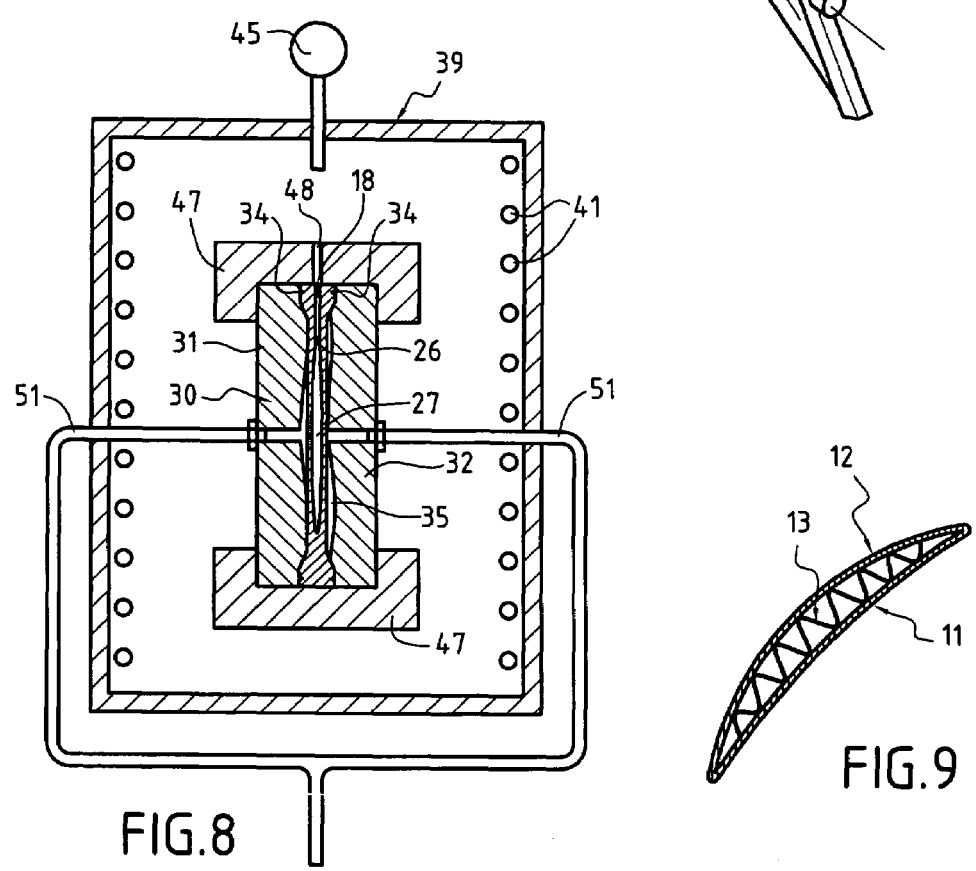

INSTALLATION FOR SHAPING A HOLLOW BLADE

The invention relates to an installation for shaping a hollow blade. More particularly, it relates to an improvement of the technique of using superplastic inflation to shape a blank made up of welded-together "sheets".

BACKGROUND OF THE INVENTION

A system is known for forming a hollow fan blade that implements a technique of hot superplastic inflation on a blank made up of a plurality of welded-together "sheets" for the purpose of deploying the sheets inside a die by inflating them at high temperature, typically about 900° C. for titanium sheets. At that temperature, the metal can deform plastically and take up the shape of the inside wall of the die when said blank is placed inside said die and is inflated by means of a gas under pressure. The blade obtained in that way is particularly strong and light in weight. Such a method is used in particular for making large-chord blades for the fan of a turbojet.

More precisely, the above-mentioned prior art method comprises the following operations in particular:
  fabricating component parts for the blade, i.e. two outer sheets and a central sheet;
  depositing a diffusion barrier in a predefined pattern between each outer sheet and the central sheet;
  assembling together the three sheets and applying diffusion-welding thereto so as to bond together all their areas in contact on which the diffusion barrier has not been deposited;
  shaping the resulting blank to take up an aerodynamic profile;
  inflating the blank by applying gas pressure to its inside at a temperature that makes superplastic inflation possible; and
  proceeding with final machining, in particular trimming the inflated blank so as to obtain a hollow blade.

The operation of superplastic inflation is a step in the above-summarized process that is particularly difficult and expensive. At present, each blade is formed by placing the blank in a hollow die that is very thick in order to withstand the pressure, until the two outer sheets come to fit against the inside surface of the hollow die. During this superplastic forming operation, the central sheet becomes deployed in such a manner as to constitute internal stiffening reinforcement. The die which is raised to high temperature must be capable of withstanding the high pressure that is applied thereto for a period of time that is quite long. On average about 2 hours (h) are needed to shape such a blade. The weight and the expense of the tooling are thus considerable, since the tooling must be dimensioned to accommodate the inflation forces and also the twisting forces that result from the special shape of the blank that has already been given an aerodynamic profile. In addition, the thermal inertia associated with that type of thick-walled die is considerable and contributes to increasing the above-mentioned cycle duration. Temperature gradients are also increased, and that leads to a reduction in the lifetime of the tooling.

In another field, U.S. Pat. No. 4,951,491 describes a technique for superplastic forming of a single sheet placed in tooling that is itself placed inside an autoclave. The two portions of the tooling are pressed on either side of the periphery of the sheet that is to be deformed.

In another possible implementation, a pressure difference is established inside the die on either side of the sheet that is to be deformed. That requires pressure to be exerted on the tooling that is greater than the inflation pressure in order to ensure that the tooling is closed. Mechanical stresses thus remain large even though the closure pressure is isostatic. It is difficult to establish the required pressure difference. That is why, in a second implementation, the tooling is closed by a mechanical system based on bolts. That second technique presents two drawbacks. Bolting is performed at ambient temperature prior to putting the autoclave into operation. At ambient temperature it is practically impossible to deform the blank in order to achieve good sealing between the blank and the two elements of the die. It is therefore very difficult to seal the die. It is doubtful whether such a bolt system can be reused after a single high temperature inflation cycle. It is therefore necessary to provide a bolted fastener system for each part that is made in that way. The invention serves to solve the above-mentioned problems.

OBJECTS AND SUMMARY OF THE INVENTION

More particularly, the invention provides an installation for shaping at least one hollow blade, e.g. a turbojet fan blade, the installation comprising a hollow die for superplastic inflation of a blank comprising two outer sheets welded together to define between them a lamellar space, the installation being of the type in which said die comprises two hollow shapes suitable for being assembled together in leaktight manner while being clamped around the periphery of said blank, wherein said die is situated inside an autoclave-forming enclosure containing heater means, wherein it is connected to means for applying a gas pressure difference between said lamellar space inside the blank and the internal space defined between said blank and said die, and wherein said two hollow shapes are assembled together by U-shaped clamps made of a material having a coefficient of expansion that is smaller than that of the material constituting said hollow shapes.

In known manner, the blank includes at least one inflation duct or the like opening out into said lamellar space. This space thus communicates with the autoclave-forming enclosure so that the pressure inside the autoclave is also the pressure that becomes established inside the blank, assuming that said internal space is left at atmospheric pressure. The autoclave-forming enclosure is pressurized using an inert gas, in particular argon.

Contrary to that which is described in the above-mentioned US patent, the enclosure is sealed by means of differential expansion between firstly the two hollow shapes defining the internal space of the die, and secondly the U-shaped clamps. The clamps may advantageously be made of molybdenum alloy, e.g. the alloy known under the reference TZM and that comprises about 99% molybdenum. The remainder of the tooling is made of nickel-iron alloy. The sheets of the blank are generally made of titanium.

With the above-mentioned configuration, the die is sealed during the rise in temperature, prior to the pressure inside the autoclave being raised. Any assembly system relying on bolts is eliminated; this leads to a significant saving in time during the cycle. The mechanical sealing system can also be reused and it is easy to take apart.

To make a blade, a pressurization cycle is used comprising a controlled rise in pressure followed by a period during which constant pressure is maintained, and finally followed by a controlled decrease in pressure. Such an inflation cycle can be controlled equally well by controlling the pressure established inside the autoclave or by controlling the pressure in the internal space defined between said blank and said die, or by a combination of both techniques.

Finally, the autoclave-forming enclosure may advantageously contain a plurality of dies enabling a plurality of blades to be shaped during a single inflation cycle.

BRIEF DESCRIPTION OF THE DRAWINGS

The invention will be better understood and other advantages thereof will appear better in the light of the following description given purely by way of example and with reference to the accompanying drawings diagrammatically illustrating the fabrication of a hollow blade, and in which:

FIGS. 1 to 7 are highly diagrammatic and show certain steps in the preparation of a hollow blade;

FIG. 8 is a diagram showing a shaping installation in accordance with the invention and suitable for performing superplastic inflation proper; and FIG. 9 is a diagrammatic section of the resulting hollow blade.

MORE DETAILED DESCRIPTION

Figure 3:
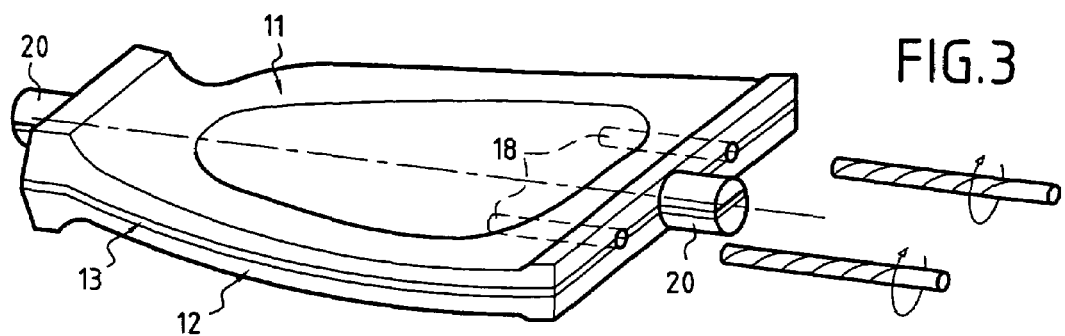
Figure 4:
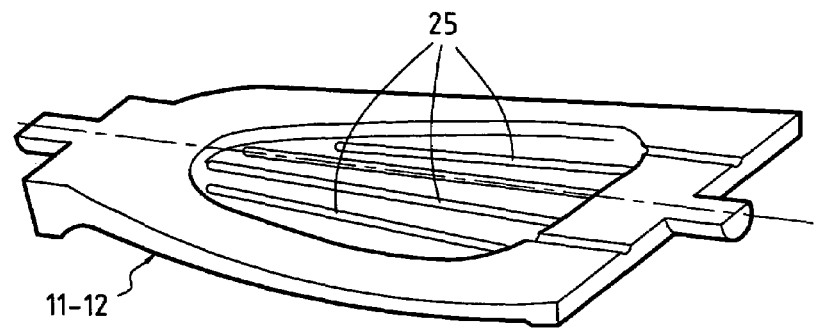
Figure 5:
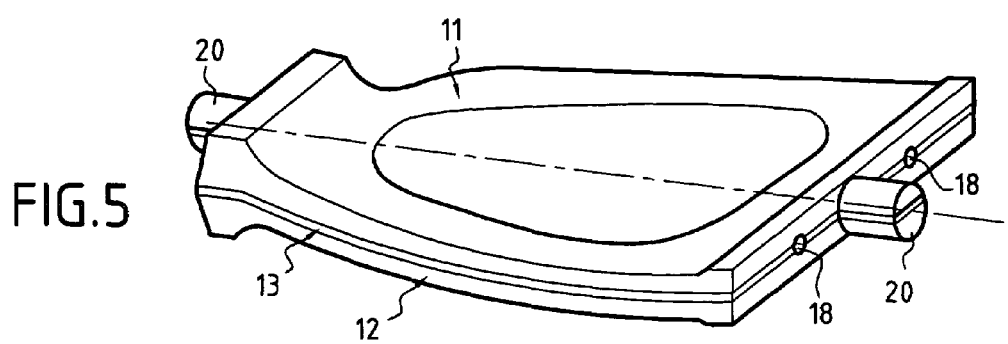

The essential steps in the fabrication of a hollow blade (typically a turbojet fan blade) are recalled briefly with reference more particularly to FIGS. 1 to 7. Such a blade is made up of three "sheets", namely two outer sheets 11 and 12 that subsequently constitute the pressure and suction faces of the blade, plus a central sheet 13 for constituting internal stiffening reinforcement, extending between the pressure and suction faces. The sheets 11 and 12 have thicker portions 15 and 16 in their zones in the vicinity of the blade root and in the vicinity of the blade tip. They may be blanked-out by forging and terminated by precision machining, as shown in FIG. 1, prior to performing the superplastic inflation process. Said sheets are shaped so as to define centering pegs 20 that project from the thick portions.

The three sheets are pressed against one another (FIG. 2) with the central sheet 13 being interposed between the outer sheets 11 and 12, and the sheets are clamped in this position. One or more inflation ducts 18 are then drilled (FIG. 3) parallel to the sheets in the vicinity of the central sheet 13. Said sheets are then separated in order to move onto the step shown in FIG. 4 which consists in depositing an anti-diffusion agent 25 on the inside faces of the outer sheets 11 and 12 and in a configuration that is predefined by silkscreen printing. The agent serves to form an anti-diffusion barrier after heat treatment has been applied. This configuration may comprise, for example, a plurality of parallel strips offset in a staggered configuration from one sheet to the other. The central sheet may include holes to establish communication from side to side thereof, between those portions that are covered by the diffusion barrier.

The parts are reassembled (FIG. 5) and welded together around the periphery. This welding may be of conventional tungsten inert gas (TIG) type, or it may be electron-beam welding. This operation is followed by a degradation/pre-welding stage at a temperature lying in the range 200° C. to 400° C. for the purpose of eliminating the degradation products of the anti-diffusion agents which would be harmful for a subsequent diffusion-welding operation.

The following step (FIG. 6) consists in performing a diffusion-welding operation on the three sheets at high temperature and under high isostatic pressure. The effect of this operation is to assemble the three sheets together over their entire areas that are in contact, with the exception of those preserved by the diffusion barrier.

From this moment, it can therefore be considered that a blank 26 has been defined that includes a lamellar space between the outer sheets on either side of the central sheet, this lamellar space being the result of the diffusion barrier. Naturally, the configuration of the diffusion barrier is such that the lamellar space communicates with the previously-drilled inflation duct(s) 18.

Figure 6:
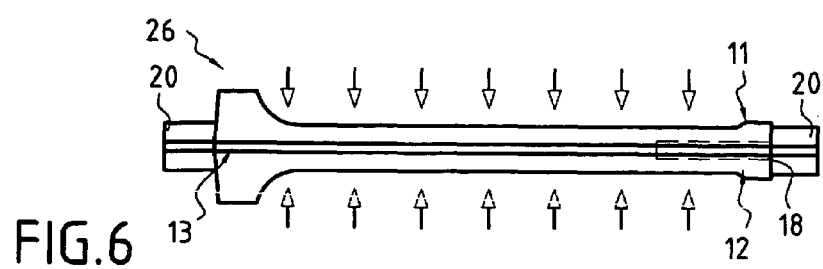

Said lamellar space is not visible in FIGS. 6 and 7 which are prior to inflation. It can be seen under reference 27 in FIG. 8 once it has already started to be expanded.

The following operations are conventional and consist in cambering (FIG. 7A), setting to length (FIG. 7B), and twisting (FIG. 7C), leading to the blank 26 being given an aerodynamic profile prior to superplastic inflation, proper.

After superplastic inflation, the blade is subjected to final machining (in particular trimming) and appropriate surface treatment.

Methods of fabricating a hollow blade using the above-outlined technique are described in greater detail in document FR 2 724 127, for example.

The invention relates more particularly to the operation of superplastic inflation, i.e. in this case the step in the method that takes place after the blank has been given an aerodynamic profile.

The shaping installation comprises a hollow die 30 shaped to accept the blank 26 as shown in FIG. 7C. The die comprises two hollow shapes 31 and 32 suitable for being assembled against each other in leaktight manner, being clamped against the periphery of the blank itself. Each hollow shape has a peripheral rib 34 that presses against the periphery of the blank 26. The inside surfaces of the shapes, inside the respective ribs 34, are shaped to give the blade its final shape, with the outer sheets 11 and 12 being pressed against them by applying a pressure difference between the lamellar space 27 inside the blank and the internal space 35 defined between the blank and the die, i.e. in the recess of each hollow shape. In addition, the die 30 is situated inside an enclosure 39 that forms an autoclave, and that contains heater means 41. A generator 45 of gas under pressure is connected to the enclosure 39. The enclosure is pressurized using an inert gas, e.g. argon.

According to an important characteristic of the invention, the two shapes 31 and 32 of the die are assembled together by U-shaped clamps 47 made of a material having a coefficient of expansion that is smaller than that of the material constituting said shape. It is thus the increase in temperature (and not the increase in pressure) that ensures that the die 30 is closed in leaktight manner.

For inflation purposes, the die is connected to means for applying a gas pressure difference between said lamellar space 27 and said internal space 35. In the example described, these means are implemented by the fact that the inflation duct(s) formed in the blank communicate with the autoclave-forming enclosure 39 while said internal space of the die, on either side of the blank, is in communication with the outside via ducts 51. The clamps 47 are shaped and disposed on the periphery of the die 30 to clamp the part in such a manner as to avoid shutting off the inflation ducts 18. In the example described, said internal space 35 is thus left at atmospheric pressure. In a variant, it would be entirely possible to connect these ducts (and consequently the space inside the die) to means for drawing a vacuum (not shown). The installation may also include means for controlling the gas pressure inside the autoclave-forming enclosure, so as to control the inflation cycle to have a pressure-rise stage followed by a plateau period during which pressure is maintained, and then by a period during which pressure is lowered. The inflation cycle may also be controlled at least in part by means for controlling the gas pressure in said internal space 35. In particular, this applies if said space is connected to means for drawing a vacuum. The vacuum can be controlled in order to obtain finer control over the inflation cycle.

The clamps 47 may be made of a molybdenum alloy. In addition, the autoclave-forming enclosure may be dimensioned to contain a plurality of similar dies 30, thus enabling a plurality of blades to be shaped during a single inflation cycle.

It should be observed that the fact of placing the die inside the autoclave enables isostatic compression to be applied to the die from the internal pressure. The walls of the die can thus be of smaller thickness. In addition, the stresses on the die are eliminated during the calibration stage. Operating under an argon atmosphere eliminates any oxidation, thus enabling the aging of the equipment to be slowed down. The mechanical system providing leaktight closure (i.e. the clamps 47) is particularly simple. It is easily taken apart (thus enabling the shaped part to be extracted quickly). It can be reused.

What is claimed is:

1. A system for shaping at least one hollow blade, said system comprising:
    a hollow die for superplastic inflation of a blank comprising two outer sheets welded together to define between them a lamellar space, wherein said die comprises two hollow parts configured to assemble together against each other in a leaktight manner while being clamped around the periphery of said blank;
    an autoclave-forming enclosure containing a heater, said hollow die being inside said autoclave-forming enclosure;
    a gas pressure generator configured to generate a pressure difference between said lamellar space inside the blank and an internal space defined between said blank and said die; and
    U-shaped clamps configured to assemble said two hollow parts, wherein said U-shaped clamps are made of a material having a coefficient of expansion that is smaller than that of the material constituting said hollow parts.

2. A system according to claim 1, wherein said blank includes an inflation duct opening out into said lamellar space, thus enabling said lamellar space to communicate with said autoclave-forming enclosure.

3. A system according to claim 1, wherein said autoclave-forming enclosure is pressurized with an inert gas.

4. A system according to claim 1, wherein said internal space is connected to a vacuum device configured to draw a vacuum in said internal space.

5. A system according to claim 2, further comprising a pressure controller configured to control the gas pressure inside said autoclave-forming enclosure in order to control the inflation cycle.

6. A system according to claim 1, further comprising a pressure controller configured to control the gas pressure inside said internal space, in order to control the inflation cycle.

7. A system according to claim 1, wherein said internal space is left at atmospheric pressure.

8. A system according to claim 1, wherein said clamps are made of a molybdenum alloy.

9. A system according to claim 1, wherein said autoclave-forming enclosure contains a plurality of dies for shaping a plurality of blades during a single inflation cycle.

10. A system according to claim 1, wherein said two hollow parts are assembled to each other only with said U-shaped clamps and without any bolt.

11. A system according to claim 1, wherein said two hollow parts are assembled together in said leaktight manner by an increase in temperature caused by said heater and not by an increase in pressure in said autoclave-forming enclosure.

12. A system according to claim 1, wherein said U-shaped clamps are disposed on opposite ends of said blank so that said blank is entirely located between said U-shaped clamps.

13. A system according to claim 1, wherein:
    said blank includes a first duct opening out into said lamellar space inside the blank so that said lamellar space communicates with said autoclave-forming enclosure,
    said gas pressure generator is configured to generate a same pressure in said lamellar space and in said autoclave-forming enclosure, and
    each of said two hollow parts includes a second duct opening out into said internal space defined between said blank and said die, wherein each second duct extends outside said autoclave-forming enclosure such that said internal space is not in communication with said autoclave-forming enclosure, and wherein pressure inside said internal space is controlled via said second duct to be different from said same pressure in said lamellar space and in said autoclave-forming enclosure.

14. A system according to claim 1, wherein each of said U-shaped clamps has a base and two arms extending from said base, and said U-shaped clamps are disposed directly on said blank so that said base and said two arms of each U-shaped clamp contact said blank without any intermediary part between the U-shaped clamps and the blank.

* * * * *